United States Patent [19]

Isobe et al.

[11] Patent Number: 4,571,221
[45] Date of Patent: Feb. 18, 1986

[54] V-BELT STRETCHING MECHANISM

[75] Inventors: Masahiro Isobe; Masashi Sugiura, both of Toyota, Japan

[73] Assignee: Toyota Jidosha Kabushiki Kaisha, Toyota, Japan

[21] Appl. No.: 683,509

[22] Filed: Dec. 19, 1984

[30] Foreign Application Priority Data

Jul. 21, 1983 [JP] Japan .................................. 58-112243
Aug. 24, 1983 [JP] Japan .................................. 58-129756

[51] Int. Cl.⁴ .............................................. F16H 7/08
[52] U.S. Cl. .................................... 474/101; 474/113; 474/115
[58] Field of Search ................ 474/101, 109, 113–115, 474/117, 126, 133

[56] References Cited

U.S. PATENT DOCUMENTS

| 2,184,541 | 12/1939 | Alkman | 474/114 X |
| 2,205,176 | 6/1940 | Sauer | 474/115 |
| 2,970,587 | 2/1961 | Estes | 474/113 X |
| 3,922,927 | 12/1975 | Shiki et al. | 474/113 |
| 4,512,752 | 4/1985 | Brenneman | 474/114 |

Primary Examiner—James A. Leppink
Assistant Examiner—Thuy M. Bui
Attorney, Agent, or Firm—Cushman, Darby & Cushman

[57] ABSTRACT

A V-belt stretching mechanism to adjust the tension of the V-belt in an internal combustion engine wherein a spring plate has two arms with ends staggered in the longitudinal direction of an adjust bolt. A slide cam has hooks which engage with the arms. Engagement and disengagement of the cam with the arms of the spring plate makes it possible to automatically adjust the tension in the V-belt.

11 Claims, 24 Drawing Figures

V-BELT STRETCHING MECHANISM

BACKGROUND OF THE INVENTION

1. Field of the Invention

The present invention relates to a V-belt stretching mechanism. This invention may be employed to stretch the alternator V-belt in an internal combustion engine to a specified tension. The term "V-belt" may include a belt used in an internal combustion engine whose section is different from V-shape.

2. Description of the Prior Art

With the conventional alternator in an internal combustion engine, as illustrated in FIG. 22, the rotation of crank pulley 1 is transmitted to alternator pulley 3 through V-belt 5 wound around alternator pulley 3 of alternator 2 and water pump pulley 4. For alternator 2 and the water pump to function normally, V-belt 5 should be maintained at an adequate tension.

As enlarged in FIGS. 23 and 24, the top of conventional alternator 2 is supported by bracket 6. The bottom of alternator 2 is fastened by alternator stay 7, which extends downward from alternator 2. Stay 7 cooperates with slider 8 and adjust bar 9, which is fixed to the engine cylinder block, to hold alternator 2 in place. The tension of V-belt 5 is adjusted by loosing lock bolt 10 and therefore slider 8 which has been fastened together with alternator stay 7 to adjust bar 9 and changing the support angle of alternator 2 by rotating adjust bolt 11 which is screw-engaged with slider 8.

However, this tension adjustment of the V-belt takes much time, because the V-belt has to be stretched using a tension gauge so that a specified tension can be attained. When the adjust bolt is not adequately tightened and the resulting V-belt tension is low, the V-belt itself will slip in the pulley groove, causing a squeak of the belt. On the other hand, when the tension is excessively high, the durability of the water pump pulley shaft and the crankshaft pulley shaft will drop and the belt itself will deteriorate.

SUMMARY OF THE INVENTION

The object of the present invention is to provide a V-belt stretching mechanism, free from the above-mentioned drawbacks, which can automatically apply a specified tension to the V-belt when the adjust bolt is being tightened.

The V-belt stretching mechanism to adjust the tension of the V-belt around pulleys according to the present invention comprises:

an adjust bar;

a slider fastened together with a pulley stay to said adjust bar;

an adjust bolt whose head contact-engages said adjust bar and whose threaded part extends through said slider;

a nut which slidably extending through said slider in the longitudinal direction of said adjust bolt and threaded onto said adjust bolt;

an extension of said nut extending away from said head of said adjust bolt;

a slide cam formed at the end of said extension;

a spring interposed between said slider and said slide cam and urging said nut toward said head of said adjust bolt; and a spring plate extending from said slider parallel to the axis of said extension and being slidably engagable with said slide cam.

In this arrangement of the V-belt stretching mechanism, when the nut is moved by tightening the adjust bolt, the slider is driven toward the head of the adjust bolt via the spring. Thereby up to a certain extent of the V-belt tensioning, engagement of the slide cam with the spring plate prevents the nut from rotating and accordingly the driving is effective. However, when the V-belt tension increases, the slide cam comes to disengage from the spring plate and as a consequence the driving ceases to be effective. Thus the V-belt tension increases no more, thereby preventing an over-tension of the V-belt. Such a setting of the V-belt tension is automatically achieved through deflection of the spring, resulting in an increased efficiency.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, wherein.

DETAILED DESCRIPTION OF THE PREFERRED EMBODIMENTS

Figure 1:
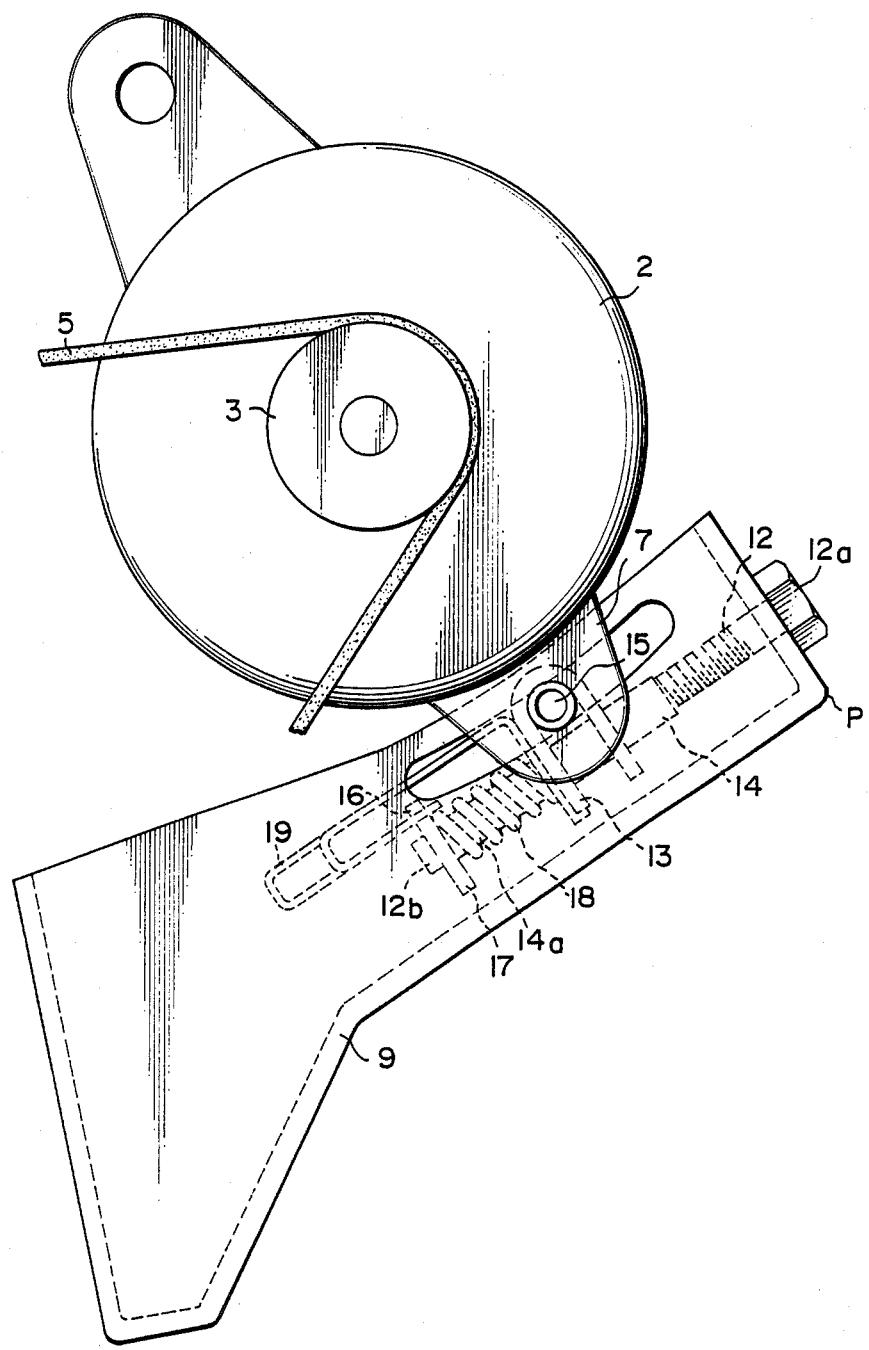
FIG. 1 is an elevational view of a V-belt stretching mechanism in the first embodiment of the present invention.
Figure 22:
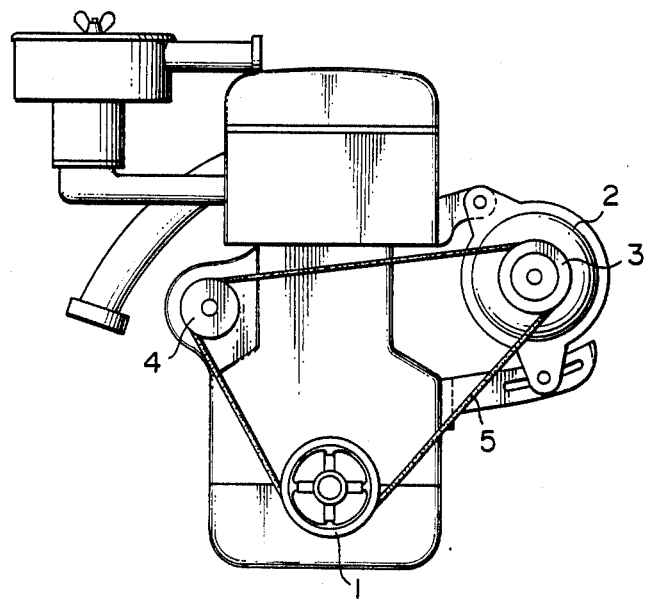
FIG. 22 is an elevational view showing the state of the V-belt wound in the conventional engine.
Figure 23:
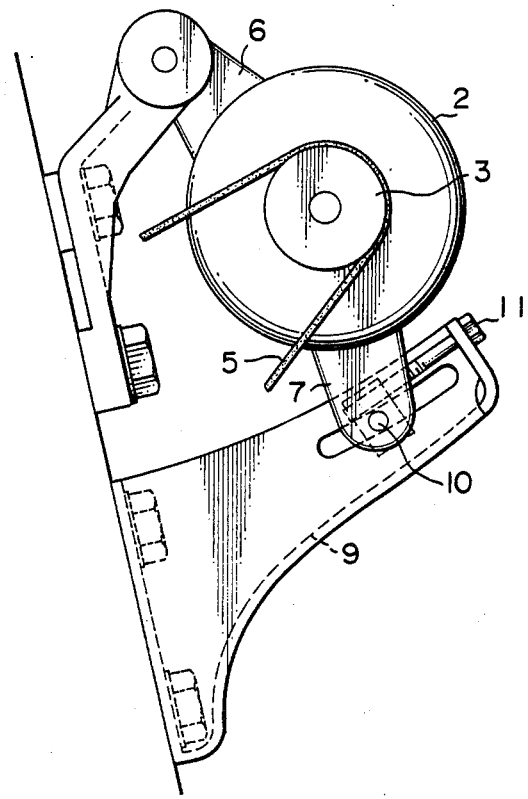
FIG. 23 is an elevational view of the vicinity of the alternator in FIG. 22.
Figure 24:
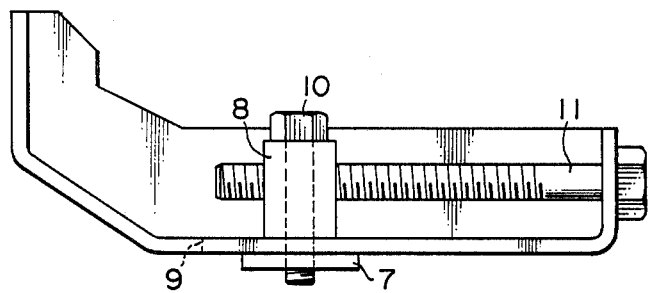
FIG. 24 is plan view showing the device in FIG. 23.

FIGS. 1 to 12 illustrate a first embodiment of the present invention. In FIG. 1, 2 is the alternator, 3 is the alternator pulley, 5 is the V-belt, 7 is the alternator stay, and 9 is the adjust bar. The construction so far is the same or equivalent to the conventional construction illustrated in FIGS. 22 to 24.

Figure 2:
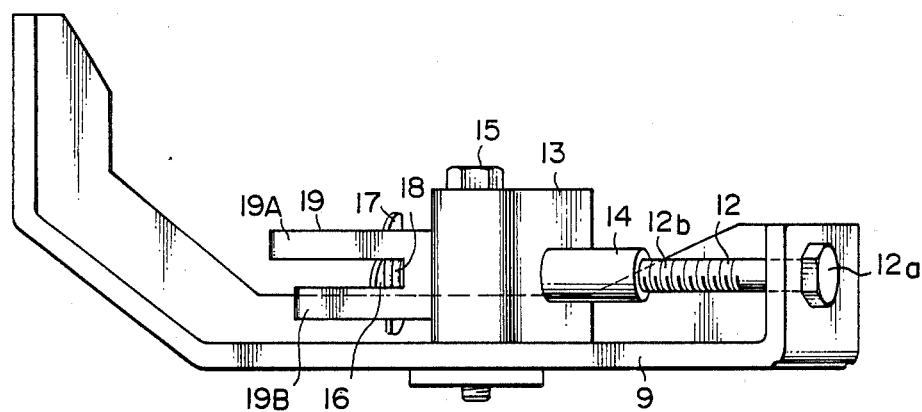
FIG. 2 is a plan view of the adjust bar in the mechanism illustrated in FIG. 1.
Figure 3:
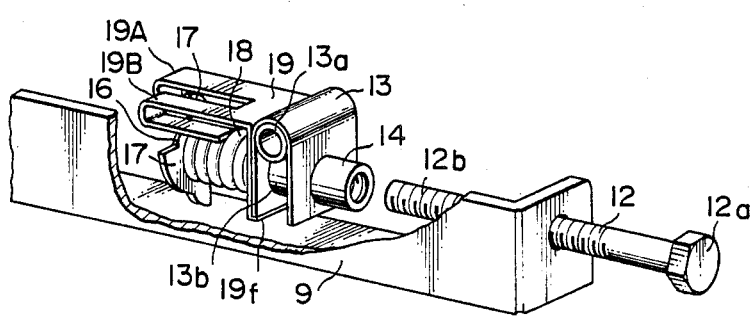
FIG. 3 is a perspective view of the vicinity of the adjust bar in the mechanism of FIG. 1.

As indicated in FIGS. 1 and 2, adjust bolt 12 passes through adjust bar 9, with its head 12a contact-engaged with adjust bar 9 and its threaded part 12b extending toward the engine cylinder block. Slider 13 is fastened by lock bolt 15 to adjust bar 9 and alternator stay 7. Nut 14 associated with slider 13 is threaded onto adjust bolt 12.

Figure 6:
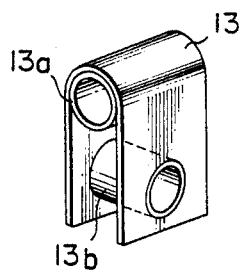
FIG. 6 is a perspective view showing the slider in FIG. 1.

As illustrated in FIG. 6, slider 13 is shaped like an inverted U and includes pipe 13a, into which lock bolt 15 goes, and collar 13b, in which nut 14 slides, extending in a direction normal to pipe 13a at a position below pipe 13a. Nut 14 is a unit separate from slider 13 and is slidable in the axial direction of adjust bolt 12 relative to slider 13.

Figure 4:
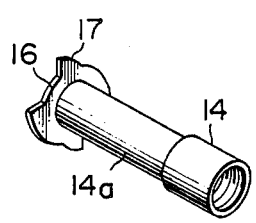
FIG. 4 is a perspective view showing the nut and the slide cam in FIG. 1.
Figure 7:
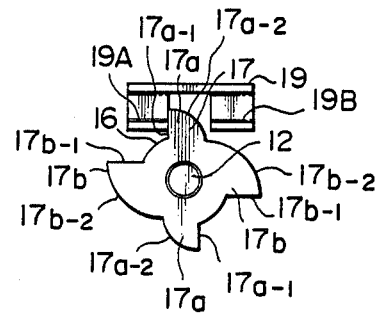
FIG. 7 is a side view showing the relationship between the slide cam and the spring plate in FIG. 1.
Figure 8:
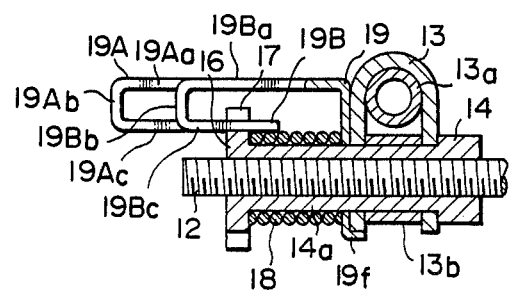
FIG. 8 is a sectional view of the vicinity of the slider and the spring plate in FIG. 1.

As indicated in FIG. 4, nut 14 has an extension 14a which extends in the axial direction of adjust bolt 12, opposite to head 12a of adjust bolt 12. Extension 14a terminates as a slide cam 16 with a hook 17 radially protruding. As indicated in FIG. 7, hook 17 is equipped with saw-teeth 17a and 17b which are opposed to each other in the rotating direction and located alternately in the circumferential direction. Outside surfaces 17a-2 and 17b-2 of saw teeth 17a and 17b, which smoothly decrease in diameter, are shaped such that when steps 17a-1 and 17b-1 of these teeth engage one arm 19A of spring plate 19, steps 17a-1 and 17b-1 do not contact the other arm 19B.

When adjust bolt 12 is tightened, nut 14 will move toward head 12a of adjust bolt 12, that is, in the direction of bringing slide cam 16 close to slider 13. When adjust bolt 12 is loosened, nut 14 will move in the opposite direction, moving slide cam 16 away from slider 13. Between slider 13 and slide cam 16 there is interposed a compressive spring 18, which urges slider 13 away from slide cam 16 toward head 12a of adjust bolt 12.

A nylon washer may be provided at both ends of the spring 18 to allow for smooth rotation.

Figure 5:
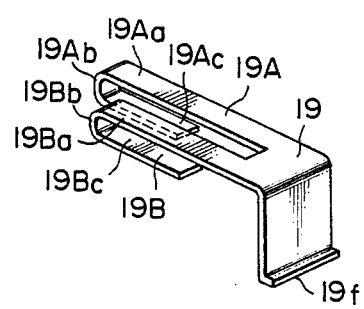
FIG. 5 is a perspective view showing the spring plate in FIG. 1.
Figure 9:
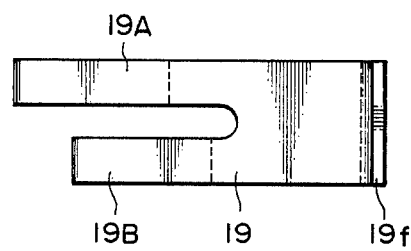
FIG. 9 is a plan view of the spring plate in FIG. 1.

As indicated in FIG. 5, slider 13 has a spring plate 19. Spring plate 19 carries a pair of arms 19A and 19B which extend from slider 13 above extension 14a away from adjust bolt head 12a. Arms 19A and 19B branch off midway and extend parallel to extension 14a at right and left positions above the axis of extension 14a. Arms 19A and 19B consist of first parts 19Aa and 19Ba which extend parallel to extension 14a, second parts 19Ab and 19Bb which turn from first parts 19Aa and 19Ba and extend downward, and third parts 19Ac and 19Bc which extend toward adjust bolt head 12a. As indicated in FIGS. 5 and 9, the ends of third parts 19Ac and 19Bc toward adjust bolt head 12a are staggered from each other in the longitudinal direction of extension 14a. Third part 19Ac of arm 19A extends to a point less close to adjust bolt head 12a than third part 19Bc of arm 19B. Second part 19Ab of arm 19A is located farther from adjust bolt head 12a than second part 19Bb of arm 19B. Spring plate 19 extends downward following the side surface of slider 13 on the side of slide cam 16, bends to the under side of slider 13 at the bottom of slider 13 and terminates at 19f (See FIGS. 3 and 5).

When adjust bolt 12 is tightened a little, spring plate 19 engages hook 17 of slide cam 16. However, the lengths and locations of arms 19A and 19B of spring plate 19 are selected such that, when adjust bolt 12 is tightened to a greater extent and as a consequence slide cam 16 comes closer to adjust bolt head 12a, engagement is lost between hook 17 and third part 19Ac of arm 19A of spring plate 19.

As adjust bolt 12 is loosened, slide cam 16 moves farther away from adjust bolt head 12a, and as a consequence, engagement is lost between hook 17 and third part 19Bc of arm 19B of spring plate 19. The ends of arms 19A and 19B are made staggered so that, even if the engagement with one arm 19A or 19B is lost, the engagement of hook 17 with another arm 19B or 19A is maintained, thereby making it possible to turn nut 14 in either the tightening direction or the loosening direction between two extreme positions.

Figure 10:
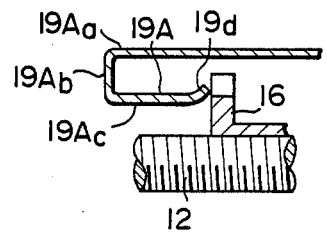
FIG. 10 is a sectional view of the vicinity of the spring plate and the slide cam in FIG. 1.
Figure 11:
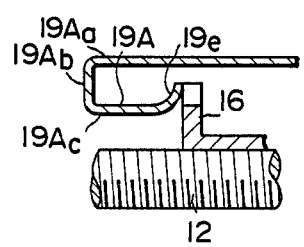
FIG. 11 is a sectional view showing the vicinity of the spring plate and the slide cam of FIG. 1 in a different example.
Figure 12:
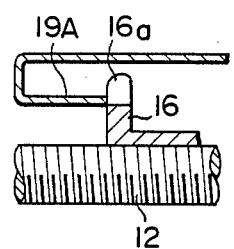
FIG. 12 is a sectional view showing the vicinity of the spring plate and the slide cam of FIG. 1 in still another example.

The ends of third parts 19Ac and 19Bc toward the adjust bolt head 12a may be inclined upward as illustrated in FIG. 10 (19d indicates the slope) or may be bent upward with roundness as illustrated in FIG. 11 (19e indicates the bend). Also, as illustrated in FIG. 12, round portion 16a may be formed on the end surface of slide cam 16. Thus smooth engagement and disengagement can be ensured between arms 19A and 19B and slide cam 16.

Next the function of the mechanism in the above arrangement of the first embodiment will be explained.

When V-belt 5 is to be stretched, at first lock bolt 15 is loosened to make slider 13 movable with respect to adjust bar 9. Then adjust bolt 12 is tightened. Since the rotation of nut 14 is arrested through engagement between step 17a-1 of hook 17 of slide cam 16 and the third part 19Ac of arm 19A of spring plate 19, hook 17a slides between arms 19A and 19B and as a consequence nut 14 and slide cam 16 are moved in the direction of adjust bolt head 12a, thereby shifting slider 13 toward adjust bolt head 12a via spring 18. In this way V-belt 5 is stretched.

As the tension of V-belt 5 comes closer to the specified value, the shift of slider 13 declines under the load of the V-belt and, with the deflection of spring 18 increased, slide cam 16 slides along spring plate 19. When engagement is lost between step 17a-1 of hook 17 and third part 19Ac of arm 19A of spring plate 19, slide cam 16 and nut 14 begin to make an integrated rotation. Then even if adjust bolt 12 in further tightened, nut 14 slips in rotation and the tension of V-belt 5 increases no more. The strength of spring 18 is set such that this tension can be the specified tension of the V-belt and thus the V-belt can be automatically stretched to a specified tension. This technique for setting the tension requires no tension gauge and accordingly it is easy.

When V-belt 5 is to be loosened, adjust bolt 12 is turned in an opposite direction. Step 17b-1 of hook 17b of slide cam 16, which turns together with nut 14, engages third part 19Bc of arm 19B of spring plate 19 and thus the rotation is locked. As a result, hook 17 slides between arms 19A and 19B of spring plate 19 in the direction away from slider 13. As a result, spring 18 is elongated and the force of spring 18 biasing slider 13 decreases, thereby lessening the tension on V-belt 5.

Eventually, loosening adjust bolt 12 causes step 17b-1 of hook 17b to disengage from third part 19Bc of arm 19B and nut 14 begins to slip in rotation, preventing further decrease in the tension of V-belt 5.

If adjust bolt 12 is again turned in the direction of tightening the V-belt 5, V-belt 5 can be again stretched.

This method of setting the tension of V-belt 5 is available not only for automatic stretching of V-belt 5 but also for automatic prevention of excessive looseness of V-belt 5, since the positions of both ends of arms 19A and 19B, in the longitudinal direction of extension 14a of nut 14, are staggered from each other.

Since spring plate 19 is located above extension 14a of nut 14, the distance from the swing center of the alternator is shorter than when the spring plate is located below nut 14. Therefore, a smaller spring plate 19 suffices to swing alternator 2 by the same angle. Besides, the bottom position of adjust bar 9 can be raised. Accordingly, the top position P (see FIG. 1) of adjust bar 9 can be brought closer to the engine, thereby facilitating accommodation of the device in a cramped space.

Figure 13:
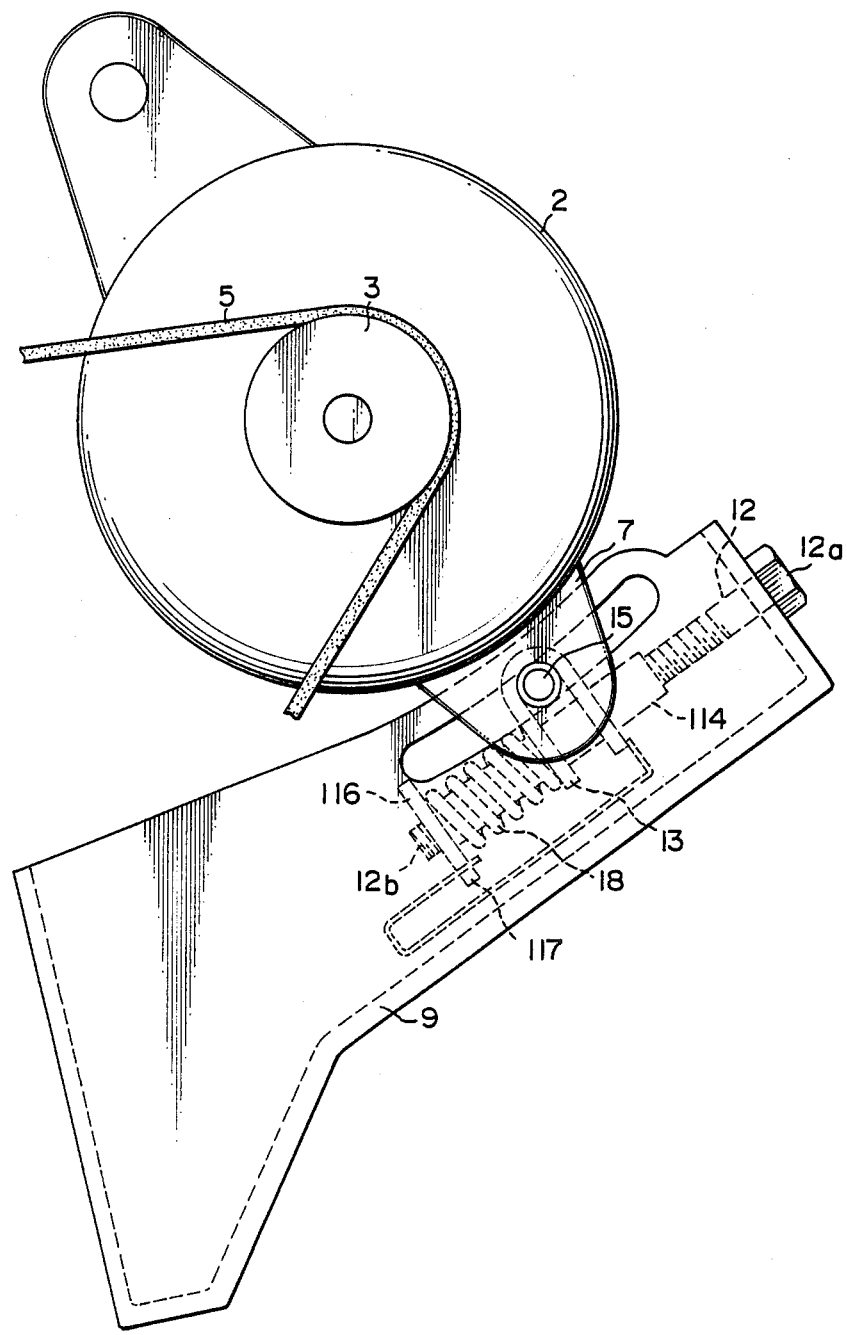
FIG. 13 is an elevational view of a V-belt stretching mechanism in the second embodiment of the present invention.
Figure 14:
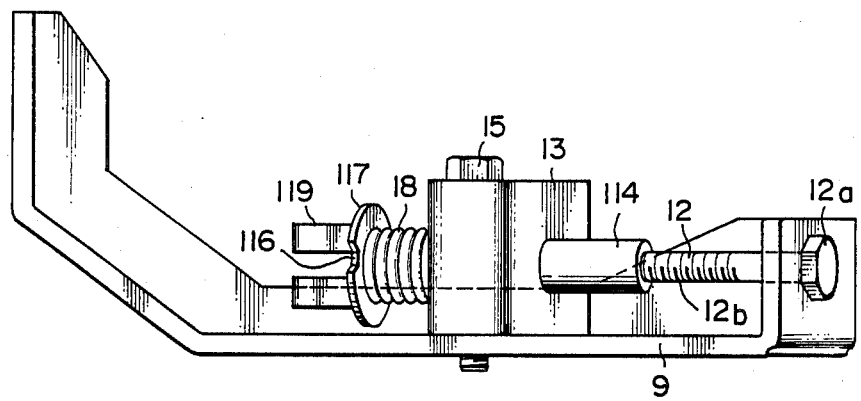
FIG. 14 is a plan view of the adjust bar in the mechanism of FIG. 13.
Figure 15:
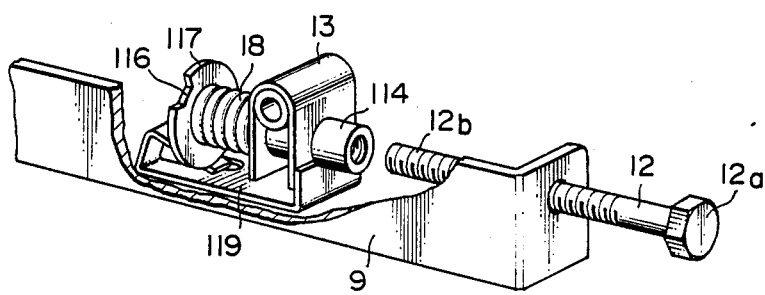
FIG. 15 is a perspective view of the vicinity of the adjust bar in the mechanism of FIG. 13.

Further, since the external shape of hook 17 is a saw tooth, smooth curved surfaces 17a-2 and 17b-2 are not in contact with arms 19A and 19B when steps 17a-1 and 17b-1 are in contact with arms 19A and 19B. Accordingly, with a small frictional resistance to sliding, V-belt 5 can be stretched with a light force to a specified tension. Moreover, collar 13b, provided in slider 13, helps to smooth the sliding of slider 13 against nut 14, helps a light on the force necessary for setting for the V-belt tension, and lessens the total length of nut 14. Furthermore, if spring plate 19 or slide cam 16 is provided with a smoothing means of any one of the shapes in FIGS. 13, 14 and 15 or a combination of these shapes, engagement and disengagement between spring plate 19 and slide cam 16 will be made still smoother.

The end of spring plate 19 is not welded to the slider 13 but constructed such that bend 19f (see FIGS. 3 and 5) contact-engages the lower end of slider 13. This simplifies the anti-turn structure of spring plate 19 against slider 13, enhancing manufacturing efficiency.

It is apparent from the above description that various benefits accrue from the V-belt stretching mechanism of the first embodiment of the present invention. Namely, since the end positions of arms 19A and 19B of spring plate 19 are staggered from each other in the longitudinal direction of extension 14a, an anti-slip device can be provided in both the tightening and the loosening direction of the V-belt.

When spring plate 19 is located above extension 14a of nut 14, spring plate 19 can be made smaller and also adjust bar 9 can be made smaller.

Further, since hook 17 is designed in saw-tooth form, the contact between the outside of hook 17 and arms 19A and 19B of spring plate 19 can be avoided and as a consequence sliding can occur with a slight force, thereby assuring the smooth setting of tension.

Next, a V-belt stretching mechanism according to a second embodiment of the present invention will be explained. FIGS. 13 to 21 illustrate the second embodiment. With like part identified by like symbols in both the first and the second embodiments, only different parts of the second embodiment will be dealt with here, avoiding an overlapping of descriptions.

Figure 16:
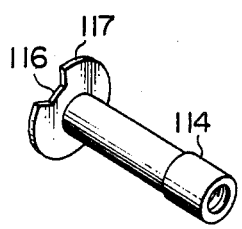
FIG. 16 is a perspective view of the nut and the slide cam in FIG. 13.

As indicated in FIG. 16, nut 114 extends away from adjust bolt head 12a and extension 114a terminates as a radial protrusion forming slide cam 116 having a convex hook 117 on the periphery. Nut 114 engages adjust bolt 12. When adjust bolt 12 is tightened, nut 114 will be driven toward adjust bolt head 12a, if the rotation is restricted. Between slider 13 and slide cam 116 is interposed a compressive spring 18, which urges slider 13 to move toward adjust bolt head 12a, that is, away from slide cam 16. A nylon washer or the like may be provided at both ends of spring 18 for the sake of smooth rotation.

Figure 17:
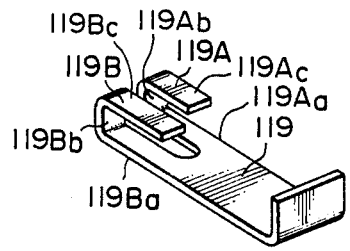
FIG. 17 is a perspective view of the spring plate in FIG. 13.
Figure 18:
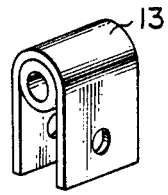
FIG. 18 is a perspective view of the slider in FIG. 13.

As indicated in FIG. 17, slider 13 is equipped with a spring plate 119 which is fixed to the bottom end of the side surface of slider 13 facing head 12a of adjust bolt 12. Spring plate 119 carries a pair of arms 119A and 119B which extend from slider 13 below extension 114a away from adjust bolt head 12a. Spring plate 119 splits midway into the two arms 119A and 119B and further extend parallel to extension 114a. Arms 119A, 119B consist of first parts 119Aa and 119Ba which extend parallel to extension 114a, second parts 119Ab and 119Bb which then turn and extend upward and third parts 119Ac and 119Bc which then turn and extend toward adjust bolt head 12a.

Figure 19:
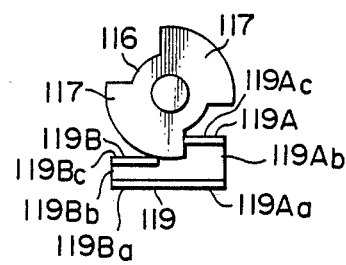
FIG. 19 is a side view illustrating the relationship between the slide cam and the spring plate in FIG. 13.
Figure 20:
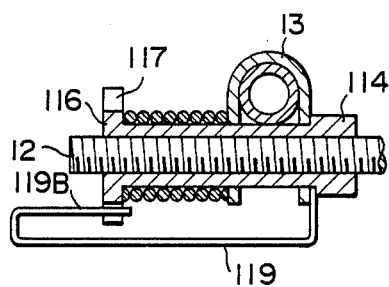
FIG. 20 is a sectional view of the vicinity of the slider and the spring plate in FIG. 13.
Figure 21:
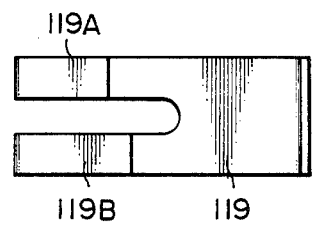
FIG. 21 is a plan view of the spring plate in FIG. 13.

It should be noted in FIG. 19 that part 119Ac extends a further distance from part 119Aa than part 119Bc pushed downward by slide cam 16 extends from part 119Ba. Therefore, when the tightening of adjust bolt 12 is slight, spring plate 119 engages hook 117 of slide cam 116.

When slide cam 116 is brought close enough to adjust bolt head 12a that is, to slider 13, spring plate 119 disengages from hook 117. This is because third parts 119Ac and 119Bc of arms 119A and 119B are located in staggered positions from each other in the longitudinal direction of extension 114a (see FIGS. 17 and 21), while second parts 119Ab and 119Bb of arms 119A and 119B are located at the same position in the longitudinal direction of extension 114a. Third part 119Ac of arm 119A extends a shorter distance toward adjust bolt head 12a than third part 119Bc of arm 119B. Therefore, even if engagement between arm 119A and cam 117 is lost, arm 119B arrests an opposite rotation of hook 117, thereby preventing an opposite rotation of nut 114.

Next, the function of the mechanism in the second embodiment will be explained.

When V-belt 5 is to be stretched, lock bolt 15 is loosened to make slider 13 movable with respect to adjust bar 9.

Next, adjust bolt 12 is tightened. With the rotation of nut 114 arrested through engagement between hook 117 of slide cam 116 and spring plate 119, nut 114 and slide cam 116 are driven toward adjust bolt head 12a, thereby shifting slider 13 toward adjust bolt head 12a via spring 18. Thus V-belt 5 can be stretched.

When the V-belt tension exceeds the specified value, the shift of slider 13 decreases under the load of the V-belt, and with the deflection of spring 18 increased, hook 117 of slide cam 116 can slide between arms 119A and 119B.

When hook 117 disengages from third part 119Ac, slide cam 116 and nut 114 begin to make an integrated rotation and thereafter even if adjust bolt 12 is further tightened, nut 114 will slip in rotation and the tension of V-belt 5 will increase no more. The strength of spring 18 is set such that this tension will be just the specified tension of V-belt 5. Thus V-belt 5 can be automatically stretched to the specified tension and the work is easy with no need of a tension gauge or the like.

When V-belt 5 is to be loosened, adjust bolt 12 is turned in the opposite direction. Hook 117 of slide cam 116 which rotates together with nut 114 engages third part 119Bc of arm 119B and locks the rotation. As a consequence, hook 117 of slide cam 116 can slide along the slit between arms 119A and 119B and can move away from adjust bolt head 12a, that is, move away from slider 13. As a result, spring 8 is elongated and, with the urging force of spring 8 decreased, the tension of V-belt 5 is decreased.

Adoption of the V-belt stretching mechanism of the above-mentioned constitution and function will yield such benefits as automatic V-belt tensioning with a mere tightening of the adjust bolt, enhancement of work efficiency, and prevention of over-tension or under-tension of the stretched V-belt.

Although only several preferred embodiments of the present invention have been described in detail, it will be appreciated by those skilled in the art that various modifications and alterations can be made to the preferred embodiments shown without materially departing from the novel teachings and advantages of this invention. Accordingly, it is to be understood that all such modifications and alterations are included within the scope of the invention as defined by the following claims.

What is claimed is:

1. A V-belt stretching mechanism to adjust the tension of a V-belt wound around pulleys, the position of one of said pulleys being adjustable by moving a stay, comprising:
   an adjust bar;
   a slider fastened together with said stay to said adjust bar;
   an adjust bolt whose head contact-engages said adjust bar and whose threaded part extends through said slider;
   a nut slidably extending through said slider in the longitudinal direction of said adjust bolt and threaded onto said adjust bolt;
   an extension of said nut extending away from said head of said adjust bolt;
   a slide cam formed at the end of said extension;
   a spring interposed between said slider and said slide cam and urging said nut toward said head of said adjust bolt; and
   a spring plate extending from said slider parallel to the axis of said extension and being slidably engagable with said slide cam.

2. The V-belt stretching mechanism of claim 1, wherein:
   said slide cam has a hook with staggered saw teeth; and
   said spring plate has a pair of arms, each arm having a first part which extends away from said head of said adjust bolt at opposite sides above said extension, a second part which extends downward from said first part, and a third part which extends toward said head of said adjust bolt from said second part and is disposed to engage with said slide cam, said second parts of said arms being staggered from each other in the longitudinal direction of said extension, the ends of said third parts toward said head of said adjust bolt being staggered from each other in the longitudinal direction of said extension.

3. The V-belt stretching mechanism of claim 2, wherein said third part of one arm which engages said hook when said adjust bolt is turned to tighten the V-belt ends a greater distance from said head of said adjust bolt than the end of said third part of the other of said arms.

4. The V-belt stretching mechanism of claim 2, wherein said second part of one arm which engages said hook when said adjust bolt is turned to tighten the V-belt is located farther from said head of said adjust bolt than said second part of the other of said arms.

5. The V-belt stretching mechanism of claim 2, wherein the end of at least one of said third parts toward the head of said adjust bolt is inclined upward.

6. The V-belt stretching mechanism of claim 2, wherein the end of at least one of said third parts toward the head of said adjust bolt is bent upward with roundness.

7. The V-belt stretching mechanism of claim 2, wherein the end of said slide cam is formed with roundness.

8. The V-belt stretching mechanism of claim 2, wherein said spring plate extends downward following the end surface of said slider on the side of said slide cam, bends at the bottom end of said slider toward the underside of said slider, and engages the bottom end of said slider at the bent part.

9. The V-belt stretching mechanism of claim 1, wherein:
   said slide cam has a hook with staggered saw teeth; and
   said spring plate has a pair of arms, each arm having a first part which extends away from said head of said adjust bolt at opposite sides under said extension, a second part which extends upward from said first part, and a third part which extends toward said head of said adjust bolt from said second part and is disposed to engage said slide cam, said second parts of said arms being aligned in the longitudinal direction of said extension, the ends of said third parts toward said head of said adjust bolt being staggered from each other in the longitudinal direction of said extension.

10. The V-belt stretching mechanism of claim 9, wherein said third part of one arm which engages said hook when said adjust bolt is turned to tighten the V-belt ends a greater distance from said head of said adjust bolt than the end of said third part of the other of said arms.

11. The V-belt stretching mechanism of claim 9, wherein said spring plate is fixed to the bottom end of the side surface of said slider facing the head of said adjust bolt.

* * * * *